May 1, 1934. A. KINDELMANN ET AL 1,957,170
LENS FOCUSING MECHANISM
Filed Jan. 10, 1931   6 Sheets-Sheet 6

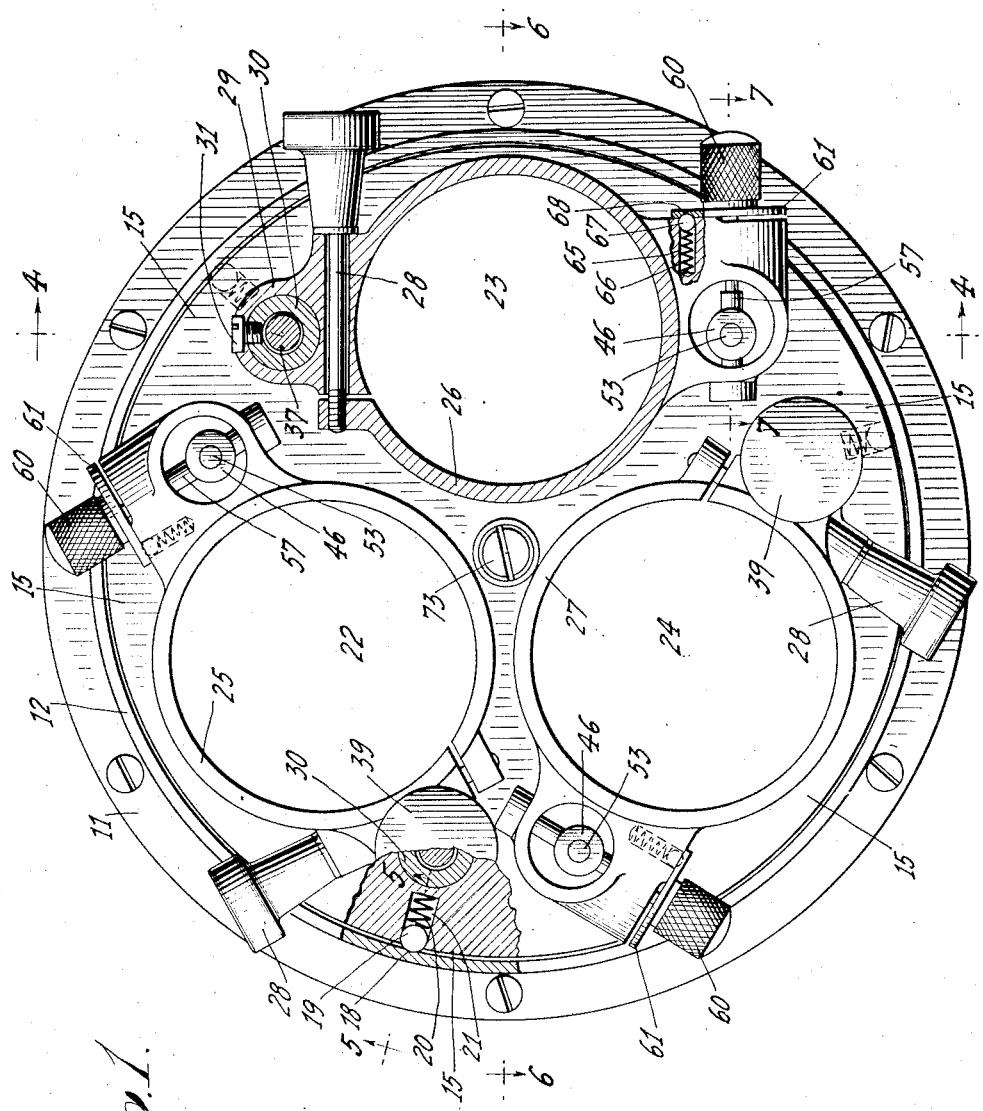

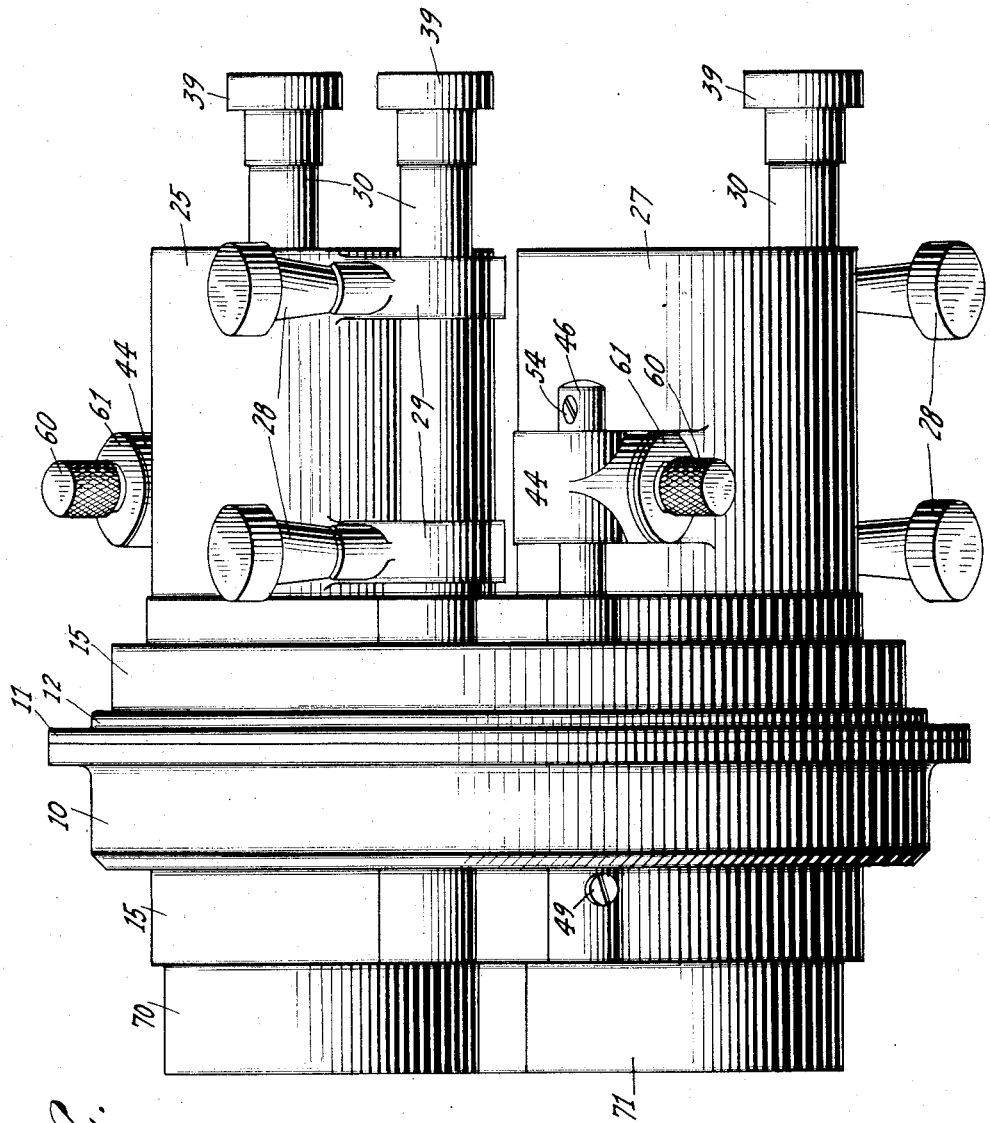

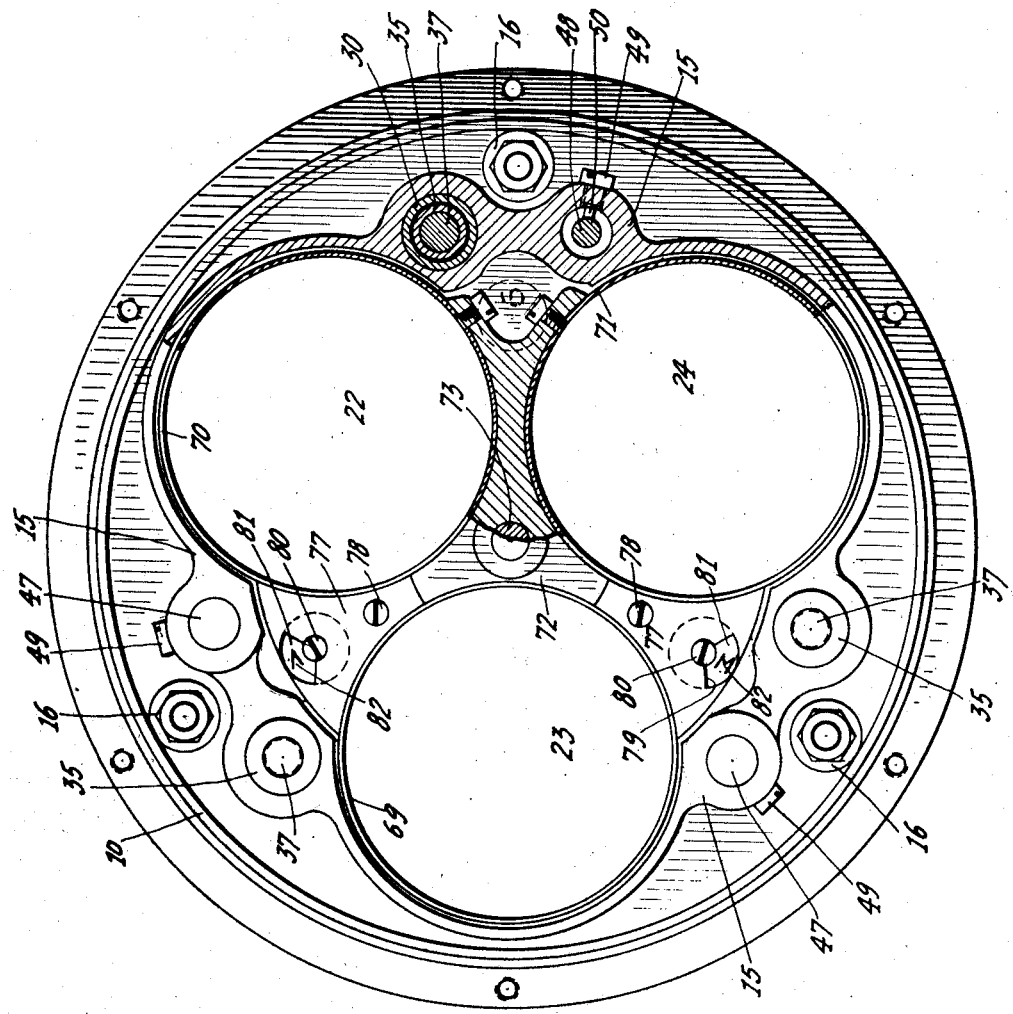

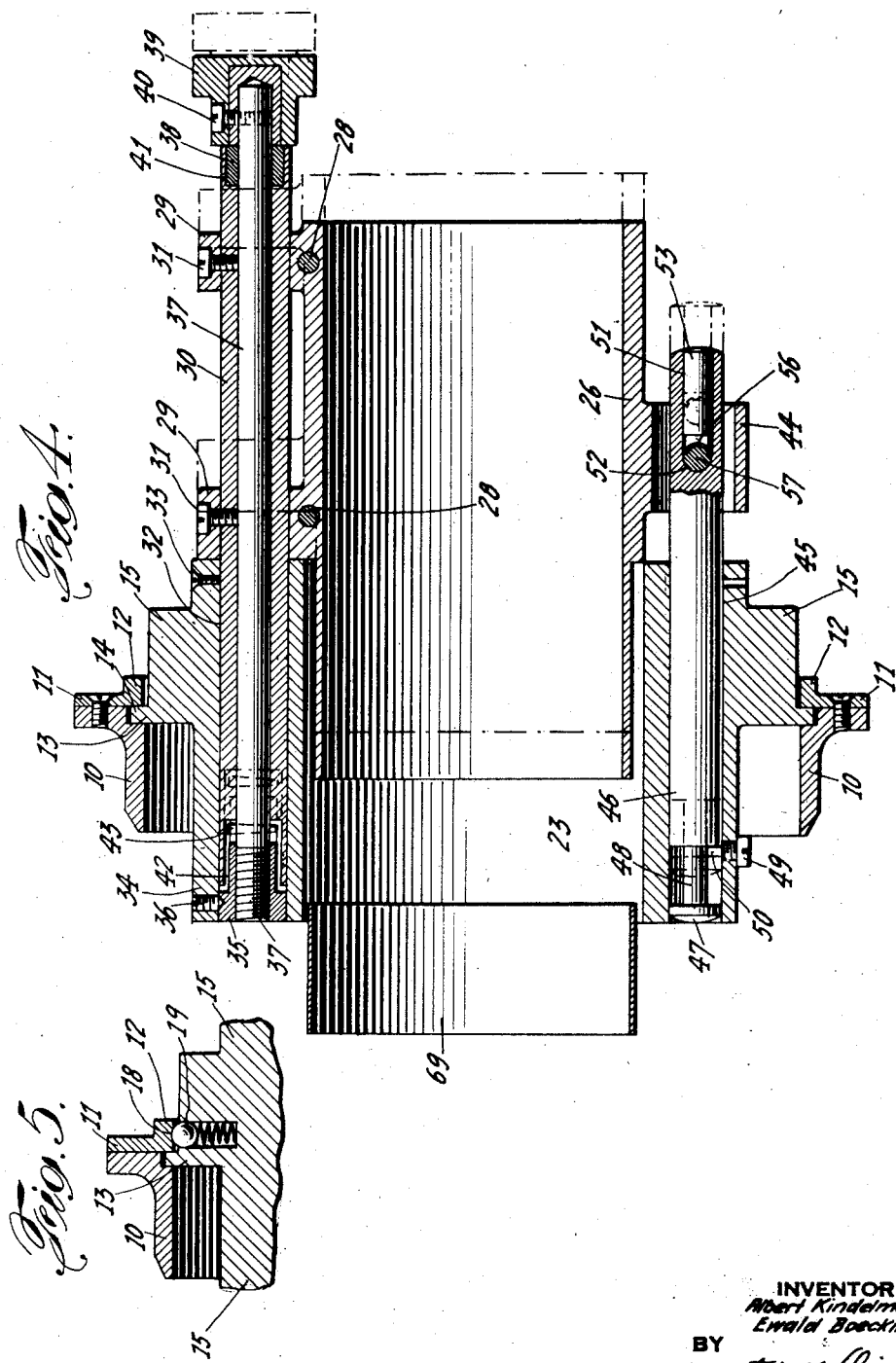

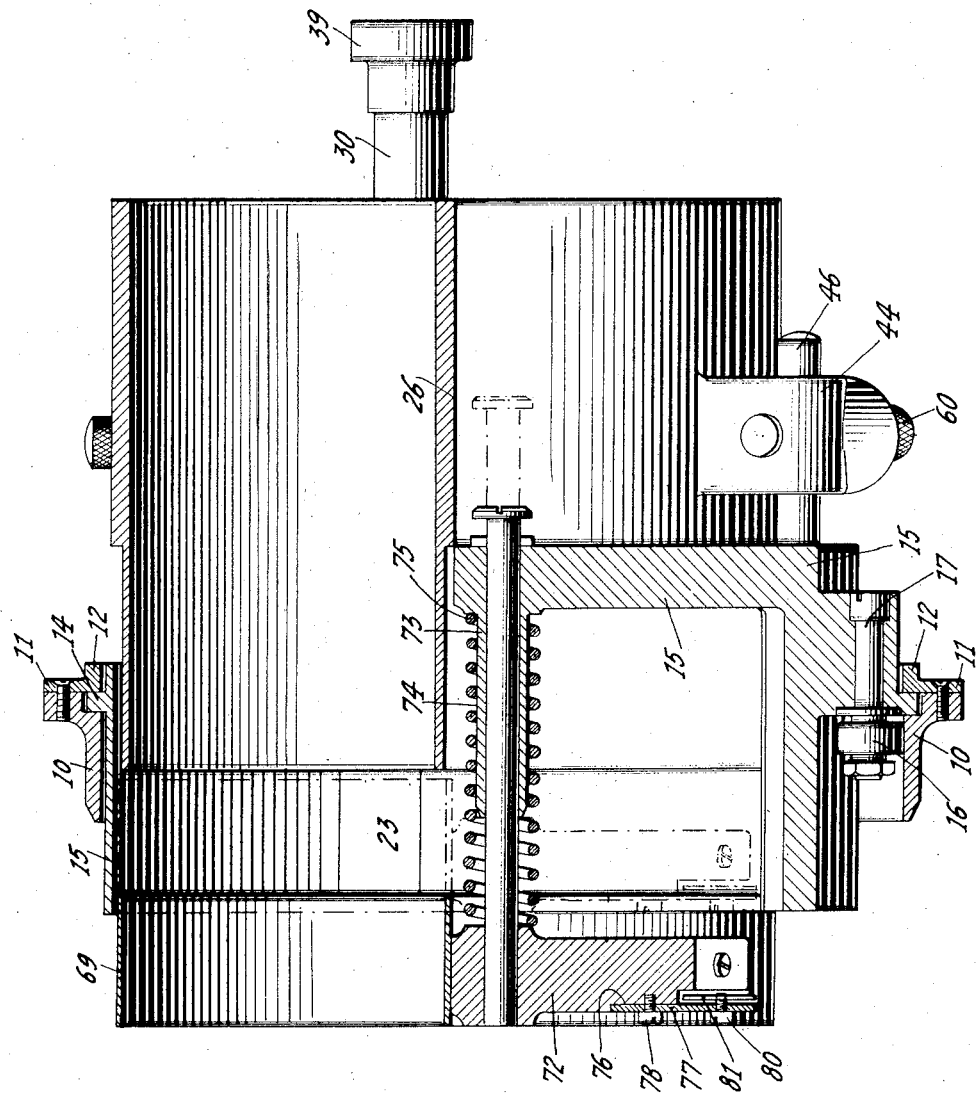

INVENTORS
Albert Kindelmann.
Ewald Boecking.
BY
Austin & Dix
ATTORNEYS

Patented May 1, 1934

1,957,170

UNITED STATES PATENT OFFICE 1,957,170

LENS FOCUSING MECHANISM

Albert Kindelmann, Floral Park, and Ewald Boecking, Brooklyn, N. Y., assignors to International Projector Corporation, New York, N. Y., a corporation of Delaware Application January 10, 1931, Serial No. 507,831

5 Claims. (Cl. 88—57)

This invention relates to motion picture machines and has particular reference to motion picture projectors and has especial reference to lens mounts constructed and arranged to provide a plurality of lenses for use in the machine in connection with different types of film which are now employed in the industry.

A main object of the invention is to provide a simple compact and efficient device whereby the lens mount or turret may be readily and quickly and easily manipulated to focus the lenses separately and independently of each other and even while the other movements of the turret are taking place.

A further object is to provide a focusing means which is simple and accurate and certain in its operation and which will permit the accurate adjustment of each lens for focusing it within predetermined limits.

Further and more specific objects, features, and advantages will more clearly appear from the detailed description given below when taken in connection with the accompanying drawings which form part of the specification and which illustrate a present preferred form of the invention.

Considered in broad and general terms the invention comprises a support for a plurality of lens mounts. This support is movable in the frame of the machine, preferably in a rotary manner but also can be moved in a direct line horizontally, vertically or otherwise. The lens mount and the support are independently shiftable around a pivotal axis by simple and efficient means to separately and independently align the axis of each lens with any one of a number of separate projection axes depending upon the type of film being passed through the machine. This machine is adapted for use with regular film, regular movietone film, grandeur film and grandeur film modified for movietone work. While each mount is pivotally and laterally shiftable about the supporting axis, the same mount is movable longitudinally or axially along the pivotal axis to focus the lens disposed in the mount. By turning a knob associated with a focusing shaft the mount is moved backward or forward and limiting stops on the mechanism determine the extreme forward and backward position between which the mount can be adjusted as desired.

Preferably the mount is pivotally hung on the support by means of a pivotal shaft or sleeve which projects into the support and is turnable and slidable therein. By means of a threaded shaft a suitable threaded axis between it and the sleeve, the turning of the threaded shaft by means of a knob thereon will cause the sleeve and its mount to move forward or backward for focusing purposes.

The present preferred form of the invention is shown in the drawings of which:

Fig. 1 is a front elevational view of the turret with certain portions broken away;

Fig. 2 is a side elevation of the turret;

Fig. 3 is a rear elevational view of the turret with certain portions broken away;

Fig. 4 is a vertical longitudinal section taken on the line 4—4 of Fig. 1;

Fig. 5 is a transverse section taken on line 5—5 of Fig. 1;

Fig. 6 is a horizontal section taken on the line 6—6 of Fig. 1;

Figure 8:
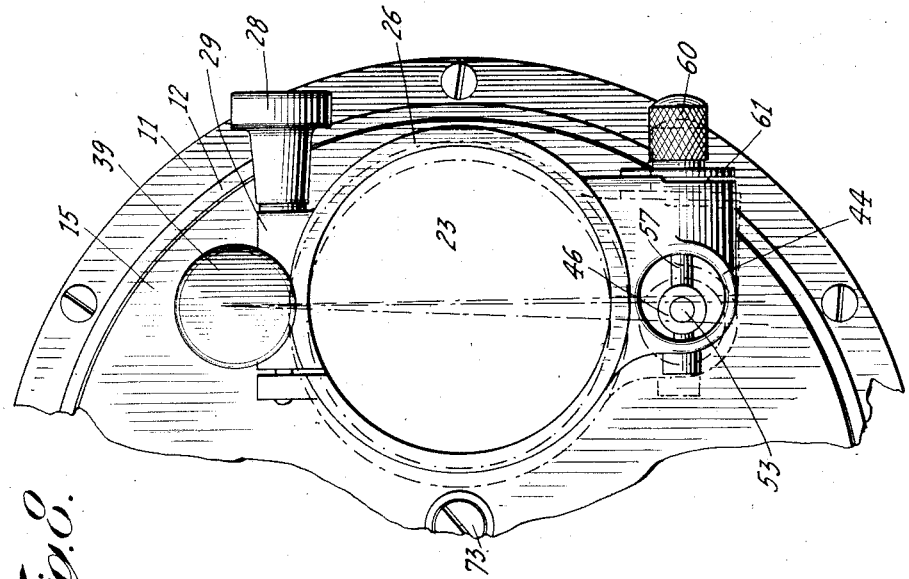
Fig. 8 is an elevation of a portion of the front of the turret indicating the adjustability of one of the lens mounts; and, Fig. 9 is an enlarged elevation of the face of one of the adjusting elements.

The present preferred form of the invention includes a rotatable turret for a plurality of lenses, which turret is mounted to rotate in a ring element 10, Fig. 4, which may be formed integrally with the main supporting frame of the machine or may be a separated element fastened to the frame in any suitable manner. This ring 10 has screwed thereto a ring 11 with a flange 12. The ring 10 is provided with a groove 13 in which rides a projecting flange 14 on the periphery of the turret element 15 and which is held in position in the groove 13 by means of the auxiliary ring 11. As shown particularly in Fig. 6, a roller 16 projects from the inner face of the turret element 15 and is rotatably mounted on a stub shaft 17 journalled in the turret element 15. There preferably are several of these rollers and stub shafts disposed around the inner face of the turret element 15 so that the turret can easily and readily be rotated within the ring 10.

Around the inner face of the ring element 10 there are disposed a plurality of notches or indentations such as 18 at predetermined points and in these notches engage balls such as 19 backed by springs 20 disposed in bores such as 21 in the turret element 15. Preferably the indentations 18 are disposed at equal distances apart and in such positions relative to the ring and the turret element that the lenses mounted on the turret element 15 will be positioned in predetermined positions and latched therein by this means when desired. In the present case this means is used to respectively align one or the other of the lenses on the turret 15 in alignment with the projection axis and to provide a simple and ready means whereby the alignment can be easily effected. Other types of positive locating means may be employed if desired.

The turret element 15 is provided with a plurality of openings extending therethrough and in the form shown there are three indicated by the numerals 22, 23 and 24. These openings are preferably spaced equi-distant angularly in the turret element 15 and through them the projection light passes, one at a time as they are respectively disposed in line with the projection beam axis. At the front of the element 15 and projecting partly into the openings 22, 23 and 24 are disposed lens holding tubes such as 25, 26 and 27. Each of these tubes is provided with the usual tightening screw 28, and has an apertured ear portion 29 to receive an elongated sleeve 30. The sleeve and the ear portions are held together by means of the set screw 31. The sleeve 30 is held in snug sliding engagement within a bore 32 in the turret element 15 as shown particularly in Fig. 4. One end of the sleeve 30 extends into a continuation of the bore 32 which is disposed in a rearwardly extending sleeve 34 projecting from one face of the turret element 15.

In the end of the sleeve 34 there is fixed a plug 35 by means of screw 36. This plug is bored and threaded to receive the threaded end of shaft 37 which extends all the way through the sleeve 30 and extends beyond the same at the opposite end of the sleeve 30. At the free or operating end of the shaft 37 there is fastened thereto a plug 38 and on this plug 38 there is mounted an operating thumb piece 39. The plug 38 and the thumb piece are held on to the shaft 37 by means of the screw 40. The plug 38 fits into a recess 41 in the end of the sleeve 30. The plug 35 in part extends into a recess 42 in the other end of the sleeve 30, and between the inner face of the plug 35 and the inner face of said recess there is disposed on the shaft 37 a key element 43, which is adapted to engage the end of sleeve 30 in one direction of movement of the shaft to move the sleeve.

It will be noticed from Fig. 4 that the inner end of each of the lens tubes such as 26 has sufficient clearance within its respective bore in the turret element 15 so that the tube and associated parts can be swung to new positions to align with different optical axes, thus each lens tube may be moved in respect to the axis of the bore 32 in the turret element 15. This swinging motion is desirable for the purpose of aligning any particular lens with one of several projection axes or with the optical center of one of several types and sizes of films which may be used in this machine.

In order to effect this swinging motion in a suitable and ready manner each of the lens tubes 25, 26 and 27 are provided on some convenient place on their peripheries with an ear such as 44. Disposed on the turret element 15 in line with each of the axes of the ears 44 there is provided a bore such as 45. In this bore which is rather elongated there is slidably disposed a shaft 46. The one end of the shaft 46 has a head 47 and adjacent thereto a reduced portion 48. In the turret element 15 adjacent the reduced portion 48 of the shaft 46 is disposed a set screw 49 having a pin portion 50 extending partly into the bore 45 to act as a stop for the shoulders formed on the shaft 46 by the reduced portion 40 thereof and thereby limit the movement of the shaft 46 in either direction, longitudinally of the projector. The forward end of the shaft 46 extends through the bore in the ear 44 and this portion of the shaft 46 is provided with a longitudinal bore 51 and a transverse bore 52. In the bore 51 there is disposed a stub shaft 53 held therein by screw 54 (Fig. 7), and having on its inner end a tooth 55. This tooth is adapted to engage with a spiral groove 56 in a transverse shaft 57 extending through bore 52 and journalled at 58 and 59 in the ear 44. The outer end of this shaft 57 is provided with a thumb element 60 and an indicator dial or disk 61 on which suitable indications such as 62 may be disposed as desired. A spring 63 is disposed beneath the dial 61 and the bottom of a recess 64 in the ear 44 in which it is disposed. Another bore 65 (Fig. 2) in the ear 44 holds a spring 66 which presses a ball 67 into one or another of several notches or indentations 68 on the under side of the dial 61.

Disposed and housed within the rear face of the turret element 15 are three auxiliary tubes such as 69, 70 and 71, Figs. 4 and 5, the axes of which are in alignment with the axes of the lens tubes 25, 26 and 27 in the front of the turret element 15. These tubes 69, 70 and 71 are mounted on and carried by a spider frame such as 72, (see Fig. 6) mounted on a central rod 73 slidably journalled in a sleeve 74 mounted centrally of the turret element 15 and extending from the rear face thereof. Between the rear face of the turret element 15 and the rear face of the spider member 72 there is disposed a spring 75 around the rod 73 and the sleeve 74. The rod 73 and with it the spider 72 carrying the tubes 69, 70 and 71 may be slid in and out of the turret element 15 and the spring 75 will always tend to keep the tubes in the position outwardly shown in Fig. 6. This position is the one in which these tubes on their outer faces will bear against the adjacent face of a film aperture gate not shown. Between each pair of the tubes 69, 70 and 71 there is disposed on the spider element 72 a shallow depression 76 in which is disposed a triangular plate such as 77, (see Fig. 3) held therein by a screw 78. This plate in each instance has at its bottom a cut 79 therein. Back of the plate 77 adjacent the cut 79 there is rotatably mounted by screw 80 a plate 81 which carries certain indicia such as 82. It will be noted that the indicia 82 are disposed at the rear of the turret in association with the auxiliary tubes, each indicia being disposed adjacent the lenses to which its color and character are limited so that as the lens is aligned with the optical axis, near the center of the machine, its corresponding indicia is disposed opposite it near the top of the machine so that it is readily observable by the operator either through the glass of the door or when the door is open.

Operation of the device

Having now described the parts and their assembly and part of their cooperation, the actual functioning will be described.

*To rotate the turret.*—The turret member 15 is merely gripped in the hand turned against the retarding action of the plurality of balls 19 lying in the notches 18 in the ring 12. These notches are disposed so that when the balls lie therein at least one of the lens tubes is in proper alignment with the desired optical axis. When a new lens is to be aligned, the turret is turned until the desired lens is in position and when it is so the balls will click into position, and the operator can tell by the slight resistance thus offered that the proper position has been reached.

The lenses properly located in their holding sleeves are introduced into the holding tubes and are fastened therein by tightening the screws 28.

*To focus the lenses.*—Referring particularly to Fig. 4, the turning of the thumb piece 39 will turn the shaft 37. This being threaded in the fixed plug 35 will cause the shaft 37 to move to the right or the left in accordance with the turning movement thereof and will advance or withdraw the lens tube which is connected to that particular shaft 37 since the lens tube ear such as 29 is screwed to the sleeve 30. This sleeve 30 is forced to the right by means of pin or key 43 and to the left by means of plug 38. As the lens tubes are thus focused their stop limits are also determined by the pin 50 engaging with the shoulders on the stub shaft 46 at the bottom of the turret 15. This is true because as the ear 44 on each lens tube moves to the right or the left it carries with it the transverse shaft 57 and the stub shaft 46 which slides in the bore 45 of the turret element 15. It will be understood that each lens tube can be thus separately focused. The construction above described with regard to one lens and its holder and operation applies to each and all of them both as to the focusing and as to the lateral shifting of the tubes for the alignment of the same tube with one or more of several different projection axes.

Figure 7:
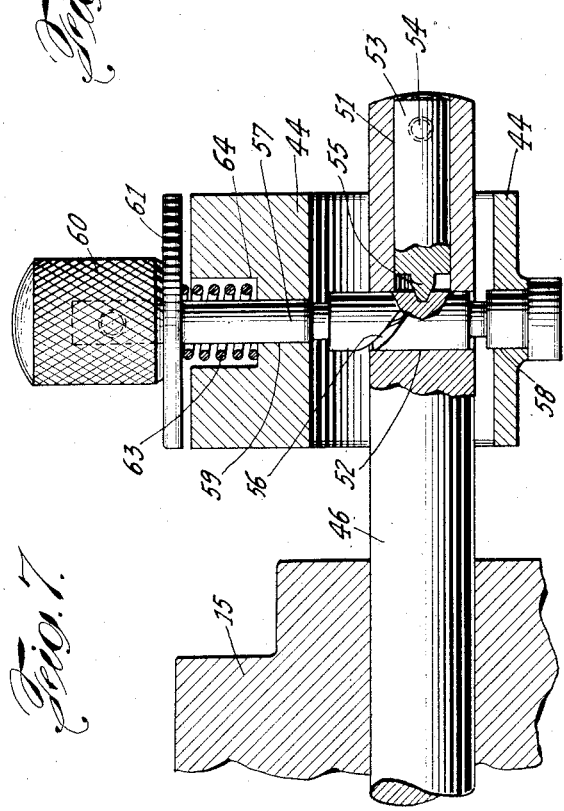
Fig. 7 is an enlarged horizontal section taken on the line 7—7 of Fig. 1.

*To shift the lenses laterally.*—Referring to Figs. 4 and 7 particularly, the rotation of the thumb piece 60 will rotate the shaft 57 and by the engagement of the tooth 55 in the spiral groove 56 will laterally shift the ear 44 and thus will likewise shift the lens tube in question in the desired direction and this partial rotation will take place around the axis of the bore 32 of turret member 15 since the lens tube carrying the ear 44 is mounted on the sleeve 30 which is slidably and rotatably mounted in said bore. The dotted center lines shown in Fig. 8 indicate the amount of swing given to the lens mounts upon the axis of sleeve 30 to align the lenses with the various optical axes as above mentioned, which correspond to the to the optical axis of the regular film, the movietone regular film and movietone grandeur film.

The operation of focusing the lens will not affect the operation of the shift device since the stub shaft 46 as described can move longitudinally to the limits of the stop pin 50 in either direction. The indicia 62 will tell which axis the tube is in alignment with.

Figure 9:
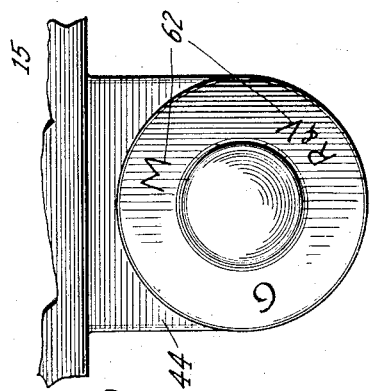

*To operate the film aperture gate.*—When the film has to be threaded or taken out of the machine for one reason or the other, it is necessary to pull back the gate from the aperture plate and when this takes place the light tubes such as 69, 70 and 71 must be moved back with the gate against which they normally are in contact. This is effected by reason of the fact that the tubes above mentioned on the spider 72 can be moved back against the action or resistance of the spring 75. The position of the lenses in the turret with respect to the main projection axis will be indicated by the indicium such as 82, see Fig. 3. In the drawings, the indicia labelled N will indicate that the lens with which it is associated is to be used in alignment when movietone film is being used in the machine; the indicium G when a wide or grandeur film is employed; the indicia R and V when a regular or vitaphone film is being employed. These same indicia are used on the dial disk 61, Figs. 7 and 9, to indicate the position of the lens shifting apparatus when these respective films are being employed in the projector.

Preferably the indicia for either turning of the turret or the shifting of the lens mounts are designated not only by characters, but by colors so that each lens has an indicium associated with it of a definite color so that when this colored indicator is noted in the indicating position the operator can tell what lens is in alignment within, without looking at the character. The same idea is employed in connection with the associated device for the lens mount so that the operator can tell by color alone just what associated position any particular lens is in.

*General operation of the machine.*—It will be assumed that the projector is employing a movietone film. In this instance the turret is moved or rotated so that the indicium M is disposed to the right hand position at the rear thereof as shown in Fig. 3 since each indicium refers to the lens tube disposed opposite to it at the back of the turret. The shift thumb piece is then rotated until the indicium M on the dial disk 61 is in position indicating that the axis of the lens has been aligned with the axis of the center of the movietone film. The lens tube can be focused by means of the knob 39 associated therewith and this can be done while the tube is being shifted or while the turret is being rotated since these various adjustments are independently operable. When the turret is properly aligned the balls will be in the notches and this reception will be felt by the operator so that he will know that the proper position has been achieved. When another film is being used such as the grandeur the operation is repeated to bring the tube marked G opposite the proper axis and the dial disk 61 again manipulated to bring the optical of that lens in alignment with the center of that particular type of film. And so again for the regular film and the vitaphone film the same manipulations are carried out to thereby align the parts as above described. It will be noted that the shifting device and the focusing device have been described in detail and shown in detail with regard to one lens tube but it is to be understood that each tube has a shift and a focusing device and each of these devices can be operated independently of the other. This apparatus permits the introduction of lenses of any desired focal lengths for the films to be run.

It will therefore, be apparent that there is provided a simple and efficient support movable in any desired direction and manner on which are disposed a plurality of lens mounts in which are housed lenses suitable for various optical axes so as to widen the usefulness of the machine and permit the use of several different types of film. The lens mounts are movable forward and backward axially for focusing, by the simple turning of the knob and are preferably mounted on a pivoted and slidable sleeve which is slidable and turnable in the support by a simple manipulation of the above knob. Therefore, the same mechanism which supports the mount is also turnable and slidable for shifting the lenses and for focusing the same.

Notation is also made of applicants' co-pending application, Serial No. 507,830, filed January 10, 1931.

The present preferred form of the invention has been described and shown in detail and with respect to a present preferred form thereof but it is not intended to limit the invention to such details and forms since many changes and modifications may be made and the invention embodied in other forms and modifications without departing from the spirit and scope of the invention in its broadest aspects. Hence it is desired to cover any and all forms and modifications of the invention which may come within the language or scope of any one or more of the appended claims.

What is claimed, is:

1. In a motion picture machine, a frame, a movable support therein, a lens holding turret disposed within said support, a plurality of lens mounts on said turret, said turret having a bore adjacent each mount, a plurality of sleeves respectively supporting said mounts and disposed slidably in said bores, an adjusting shaft rotatably disposed within each sleeve and having threaded relation to the turret, and means on each adjusting shaft to engage the respective sleeve and move it in either direction as the adjusting shaft is turned.

2. In a motion picture machine, a frame, a supporting ring therein, a rotatable lens holding turret disposed within said support, a plurality of lens mounts on said turret, said turret having a bore adjacent each mount, a plurality of sleeves respectively supporting said mounts and disposed slidably in said respective bores, an adjusting shaft in each sleeve and having threaded relation with the turret and means on each adjusting shaft to engage the respective sleeve and move it in either direction when the adjusting shaft is turned.

3. In a motion picture machine, a frame, a supporting ring thereon, a rotatable lens holding turret disposed within said ring, a plurality of lens mounts on said turret, said turret having a bore adjacent each mount, a plurality of sleeves respectively supporting said mounts and disposed slidably in the respective bores, an adjusting shaft within each sleeve, threaded plugs in the turret engaging with the respective adjusting shafts, and means adjacent each end of the respective adjusting shaft to engage the sleeve and move it in one direction or the other as the adjusting shaft is turned.

4. In a motion picture machine, a frame, a supporting ring therein, a rotatable lens holding turret disposed within said ring, a plurality of lens mounts on said turret, said turret having a bore adjacent each mount, a plurality of sleeves respectively supporting said mounts and disposed slidably in the respective bores, an adjusting shaft in each sleeve, threaded plugs in the turret engaging with the respective adjusting shafts, and projections on each shaft near each end thereof and adjacent the ends of the sleeve to engage the respective sleeves and move it and the mount in one direction or the other as the adjusting shaft is turned.

5. In a motion picture machine, a lens holding turret, a lens mount movable thereon, said turret having a bore therein disposed parallel to the axis of the lens, a supporting element disposed in the bore and connected to the lens mount, and means disposed parallel to the supporting element and engaging the same to slide the supporting element in the bore to focus the lens.

ALBERT KINDELMANN.
EWALD BOECKING.